US008851972B2

(12) United States Patent
Rodgers et al.

(10) Patent No.: US 8,851,972 B2
(45) Date of Patent: Oct. 7, 2014

(54) GAMING DEVICE HAVING MULTIPLE INTERACTING INDEPENDENTLY OPERABLE WHEELS

(71) Applicant: IGT, Reno, NV (US)

(72) Inventors: Paulina Rodgers, Reno, NV (US); Bayard S. Webb, Sparks, NV (US); Hans Elias, Reno, NV (US); Zeke Brill, Reno, NV (US)

(73) Assignee: IGT, Las Vegas, NV (US)

(*) Notice: Subject to any disclaimer, the term of this patent is extended or adjusted under 35 U.S.C. 154(b) by 0 days.

(21) Appl. No.: 13/753,139

(22) Filed: Jan. 29, 2013

(65) Prior Publication Data

US 2013/0143650 A1 Jun. 6, 2013

Related U.S. Application Data

(60) Division of application No. 13/115,644, filed on May 25, 2011, now Pat. No. 8,388,436, which is a continuation of application No. 12/207,422, filed on Sep. 9, 2008, now Pat. No. 7,967,676, which is a division of application No. 10/953,822, filed on Sep. 29, 2004, now Pat. No. 7,425,177.

(51) Int. Cl.

| | |
|---|---|
| ***A63F 13/00*** | (2014.01) |
| ***G07F 17/32*** | (2006.01) |
| ***G07F 17/34*** | (2006.01) |

(52) U.S. Cl.

CPC ............ *G07F 17/3244* (2013.01); *G07F 17/34* (2013.01)

USPC ............................................ 463/20; 463/16

(58) Field of Classification Search

CPC .......... G07F 32/32047; G07F 32/3209; G07F 32/3211; G07F 32/3225; G07F 32/323; G07F 32/3239; G07F 32/3244; G07F 32/3258; G07F 32/3272; G07F 32/3281

USPC ........... 273/138.1, 139, 141 R, 142 R, 142 H; 463/7, 16, 20, 21, 25, 31, 39, 42, 43

See application file for complete search history.

(56) References Cited

U.S. PATENT DOCUMENTS

| | | |
|---|---|---|
| 2,545,644 A | 3/1951 | Benton et al. |
| 3,633,915 A | 1/1972 | Lippert |

(Continued)

FOREIGN PATENT DOCUMENTS

| | | |
|---|---|---|
| AU | 1997 16432 | 10/1999 |
| DE | 8710757 | 11/1987 |

(Continued)

OTHER PUBLICATIONS

1DU Dice Unit Advertisement written by starpoint.uk.com, printed on May 14, 2001.

(Continued)

*Primary Examiner* — Damon Pierce
*Assistant Examiner* — Jeffrey Wong
(74) *Attorney, Agent, or Firm* — Neal, Gerber & Eisenberg LLP

(57) ABSTRACT

A gaming device having multiple interacting independently operated symbol generators, such as wheels. In one embodiment, each wheel includes a plurality of sections that are associated with a plurality of different outcomes which are displayed to a player. One or more of the wheels are activated, either sequentially or simultaneously and the results of the wheel activations influence one or more subsequent wheel activations. Upon a terminating event, an outcome based on the results from one or more spins of one or more of the wheels is provided to the player.

6 Claims, 11 Drawing Sheets

(56) References Cited

U.S. PATENT DOCUMENTS

| | | | | |
|---|---|---|---|---|
| 4,410,178 | A | 10/1983 | Partridge | |
| 4,560,161 | A | 12/1985 | Hamano | |
| 4,624,459 | A | 11/1986 | Kaufman | |
| 4,695,053 | A | 9/1987 | Vazquez, Jr. et al. | |
| 4,732,386 | A | 3/1988 | Rayfiel | |
| 4,756,531 | A | 7/1988 | DiRe | |
| 4,941,665 | A | 7/1990 | Klamer | |
| 5,184,821 | A | 2/1993 | Korenek | |
| 5,205,555 | A | 4/1993 | Hamano | |
| 5,342,047 | A | 8/1994 | Heidel et al. | |
| 5,344,144 | A | 9/1994 | Canon | |
| 5,344,145 | A | 9/1994 | Chadwick et al. | |
| 5,362,052 | A | 11/1994 | Kubatsch | |
| 5,407,200 | A | 4/1995 | Kish | |
| 5,449,173 | A | 9/1995 | Thomas et al. | |
| 5,490,670 | A | 2/1996 | Hobert | |
| 5,501,455 | A | 3/1996 | Hirata et al. | |
| 5,722,891 | A | 3/1998 | Inoue | |
| 5,788,573 | A | 8/1998 | Baerlocher et al. | |
| 5,823,874 | A | 10/1998 | Adams | |
| 5,848,932 | A | 12/1998 | Adams | |
| 5,873,781 | A | 2/1999 | Keane | |
| 5,882,261 | A | 3/1999 | Adams | |
| 5,885,157 | A | 3/1999 | Harada et al. | |
| 5,911,418 | A | 6/1999 | Adams | |
| 5,919,088 | A | 7/1999 | Weiss | |
| 5,934,999 | A | 8/1999 | Valdez | |
| 5,947,820 | A | 9/1999 | Morro et al. | |
| 5,964,463 | A | 10/1999 | Moore, Jr. | |
| 5,980,384 | A | 11/1999 | Barrie | |
| 5,997,401 | A | 12/1999 | Crawford | |
| 6,004,207 | A | 12/1999 | Wilson, Jr. et al. | |
| 6,015,346 | A | 1/2000 | Bennett | |
| 6,033,307 | A | 3/2000 | Vancura | |
| 6,059,289 | A | 5/2000 | Vancura | |
| 6,059,658 | A | 5/2000 | Mangano et al. | |
| 6,062,980 | A | 5/2000 | Luciano | |
| 6,089,976 | A | 7/2000 | Schneider et al. | |
| 6,089,978 | A | 7/2000 | Adams | |
| 6,093,102 | A | 7/2000 | Bennett | |
| 6,102,798 | A | 8/2000 | Bennett | |
| 6,113,098 | A | 9/2000 | Adams | |
| 6,120,031 | A | 9/2000 | Adams | |
| 6,120,377 | A | 9/2000 | McGinnis, Sr. et al. | |
| 6,126,542 | A | 10/2000 | Fier | |
| 6,135,884 | A | 10/2000 | Hedrick et al. | |
| 6,142,873 | A | 11/2000 | Weiss et al. | |
| 6,146,273 | A | 11/2000 | Olsen | |
| 6,159,095 | A | 12/2000 | Frohm et al. | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 * | 1/2001 | Baerlocher et al. ............. | 463/16 |
| 6,168,523 | B1 | 1/2001 | Piechowiak et al. | |
| 6,173,955 | B1 | 1/2001 | Perrie et al. | |
| 6,174,235 | B1 | 1/2001 | Walker et al. | |
| 6,186,894 | B1 | 2/2001 | Mayeroff | |
| 6,190,254 | B1 | 2/2001 | Bennett | |
| 6,190,255 | B1 | 2/2001 | Thomas et al. | |
| 6,200,217 | B1 | 3/2001 | Osawa | |
| 6,203,429 | B1 | 3/2001 | Demar et al. | |
| 6,213,876 | B1 | 4/2001 | Moore, Jr. | |
| 6,224,483 | B1 | 5/2001 | Mayeroff | |
| 6,227,971 | B1 | 5/2001 | Weiss | |
| 6,227,972 | B1 | 5/2001 | Walker et al. | |
| 6,231,442 | B1 | 5/2001 | Mayeroff | |
| 6,234,897 | B1 | 5/2001 | Frohm et al. | |
| 6,261,177 | B1 | 7/2001 | Bennett | |
| 6,270,411 | B1 | 8/2001 | Gura et al. | |
| 6,283,855 | B1 | 9/2001 | Bingham | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,312,334 | B1 | 11/2001 | Yoseloff | |
| 6,315,664 | B1 | 11/2001 | Baerlocher et al. | |
| 6,319,123 | B1 | 11/2001 | Paludi | |
| 6,328,649 | B1 | 12/2001 | Randall et al. | |
| 6,334,814 | B1 | 1/2002 | Adams | |
| 6,336,860 | B1 | 1/2002 | Webb | |
| 6,336,863 | B1 | 1/2002 | Baerlocher et al. | |
| 6,338,678 | B1 | 1/2002 | Seelig et al. | |
| 6,346,043 | B1 | 2/2002 | Colin et al. | |
| 6,347,795 | B1 | 2/2002 | DeLeljer | |
| 6,347,996 | B1 | 2/2002 | Gilmore et al. | |
| 6,364,766 | B1 | 4/2002 | Anderson et al. | |
| 6,364,767 | B1 | 4/2002 | Brossard et al. | |
| 6,375,187 | B1 | 4/2002 | Baerlocher | |
| 6,398,218 | B1 | 6/2002 | Vancura | |
| 6,398,644 | B1 | 6/2002 | Perrie et al. | |
| 6,398,651 | B1 | 6/2002 | Yamada | |
| 6,406,369 | B1 | 6/2002 | Baerlocher et al. | |
| 6,413,160 | B1 | 7/2002 | Vancura | |
| 6,419,579 | B1 | 7/2002 | Bennett | |
| 6,428,412 | B1 | 8/2002 | Anderson et al. | |
| 6,439,995 | B1 | 8/2002 | Hughs-Baird et al. | |
| 6,443,837 | B1 | 9/2002 | Jaffe et al. | |
| 6,450,884 | B1 | 9/2002 | Seelig et al. | |
| 6,454,651 | B1 | 9/2002 | Yoseloft | |
| 6,464,582 | B1 | 10/2002 | Baerlocher et al. | |
| 6,481,713 | B2 | 11/2002 | Perrie et al. | |
| 6,482,089 | B2 | 11/2002 | Demar et al. | |
| 6,491,584 | B2 | 12/2002 | Graham et al. | |
| 6,494,454 | B2 | 12/2002 | Adams | |
| 6,506,117 | B2 | 1/2003 | DeMar et al. | |
| 6,508,707 | B2 | 1/2003 | DeMar et al. | |
| 6,561,512 | B2 | 5/2003 | Luciano et al. | |
| 6,561,904 | B2 | 5/2003 | Locke et al. | |
| 6,569,015 | B1 | 5/2003 | Baerlocher et al. | |
| 6,582,306 | B1 | 6/2003 | Kaminkow | |
| 6,582,307 | B2 | 6/2003 | Webb | |
| 6,599,185 | B1 | 7/2003 | Kaminkow et al. | |
| 6,602,135 | B1 | 8/2003 | Gerrard | |
| 6,602,137 | B2 | 8/2003 | Kaminkow et al. | |
| 6,607,437 | B2 | 8/2003 | Casey et al. | |
| 6,663,489 | B2 | 12/2003 | Baerlocher | |
| 6,705,944 | B2 | 3/2004 | Luciano | |
| 6,729,955 | B2 | 5/2004 | Bennett et al. | |
| 6,749,502 | B2 | 6/2004 | Baerlocher | |
| 6,769,987 | B1 | 8/2004 | Morita et al. | |
| 6,786,819 | B2 | 9/2004 | Baerlocher et al. | |
| 6,835,132 | B2 | 12/2004 | Bennett | |
| 6,855,052 | B2 | 2/2005 | Weiss et al. | |
| 6,899,620 | B2 | 5/2005 | Kaminkow et al. | |
| 6,905,405 | B2 | 6/2005 | McClintic | |
| 6,905,407 | B2 | 6/2005 | Nordman | |
| 7,040,983 | B2 | 5/2006 | Dolloff et al. | |
| 7,056,209 | B2 | 6/2006 | Baerlocher et al. | |
| 7,059,967 | B2 | 6/2006 | Baerlocher | |
| 7,121,943 | B2 | 10/2006 | Webb et al. | |
| 7,128,646 | B2 | 10/2006 | Baerlocher et al. | |
| 7,160,188 | B2 | 1/2007 | Kaminkow et al. | |
| 7,235,011 | B2 | 6/2007 | Randall et al. | |
| 7,294,055 | B2 | 11/2007 | Baerlocher et al. | |
| 7,341,512 | B2 | 3/2008 | Dolloff et al. | |
| 7,361,088 | B2 | 4/2008 | Maya et al | |
| 7,455,585 | B2 | 11/2008 | Englman | |
| 7,614,947 | B2 | 11/2009 | Baerlocher et al. | |
| 7,740,535 | B2 | 6/2010 | Kido | |
| 7,792,920 | B2 | 9/2010 | Istvan et al. | |
| 2001/0049298 | A1 | 12/2001 | Bennett | |
| 2002/0004424 | A1 | 1/2002 | Nelson et al. | |
| 2002/0025846 | A1 | 2/2002 | Bennett et al. | |
| 2002/0025849 | A1 | 2/2002 | Olive | |
| 2002/0042294 | A1 | 4/2002 | Pau et al. | |
| 2002/0193158 | A1 * | 12/2002 | Weiss et al. ..................... | 463/16 |
| 2003/0027628 | A1 | 2/2003 | Luciano | |
| 2003/0040355 | A1 | 2/2003 | Baerlocher | |
| 2003/0064790 | A1 | 4/2003 | Hughs-Baird et al. | |
| 2003/0078089 | A1 | 4/2003 | Gray et al. | |
| 2003/0178768 | A1 | 9/2003 | Luciano et al. | |
| 2003/0181239 | A1 | 9/2003 | Walker et al. | |
| 2004/0000754 | A1 | 1/2004 | Inoue | |
| 2004/0002372 | A1 | 1/2004 | Rodgers et al. | |
| 2004/0014517 | A1 | 1/2004 | Inoue | |

(56) References Cited

U.S. PATENT DOCUMENTS

| | | | | |
|---|---|---|---|---|
| 2004/0017041 | A1 | 1/2004 | Inoue | |
| 2004/0053665 | A1 | 3/2004 | Baerlocher | |
| 2004/0077403 | A1 | 4/2004 | Maya et al. | |
| 2004/0102243 | A1 * | 5/2004 | Olsen | 463/25 |
| 2004/0150161 | A1 | 8/2004 | Inoue | |
| 2004/0171419 | A1 | 9/2004 | Walker et al. | |
| 2005/0014562 | A1 | 1/2005 | Fujimoto | |
| 2005/0054412 | A1 | 3/2005 | Gauselmann | |
| 2005/0059455 | A1 | 3/2005 | Gerrard et al. | |
| 2006/0025200 | A1 | 2/2006 | Van Asdale | |
| 2006/0080408 | A1 | 4/2006 | Istvan et al. | |
| 2006/0189364 | A1 | 8/2006 | Baerlocher | |
| 2007/0129131 | A1 | 6/2007 | Kaminkow et al. | |
| 2007/0178972 | A1 | 8/2007 | Moshal | |

FOREIGN PATENT DOCUMENTS

| | | |
|---|---|---|
| DE | 19600787 | 5/1997 |
| DE | 19613455 | 8/1997 |
| DE | 19926280 | 3/2000 |
| DE | 19936196 | 1/2001 |
| EP | 0797175 | 9/1997 |
| GB | 2100905 | 6/1981 |
| GB | 2106293 | 9/1981 |
| GB | 2090690 | 7/1982 |
| GB | 2096376 | 10/1982 |
| GB | 2137392 | 10/1984 |
| GB | 2144644 | 3/1985 |
| GB | 2153572 | 8/1985 |
| GB | 2170636 | 8/1986 |
| GB | 2180682 | 4/1987 |
| GB | 2181589 | 4/1987 |
| GB | 2183882 | 6/1987 |
| GB | 2191030 | 12/1987 |
| GB | 2201821 | 9/1988 |
| GB | 2222712 | 3/1990 |
| GB | 2225889 | 6/1990 |
| GB | 2242300 | 9/1991 |
| GB | 2322217 | 8/1998 |
| JP | 2003-53002 | 2/2003 |
| JP | 2004-73593 | 3/2004 |
| WO | WO 03/011409 | 2/2003 |

OTHER PUBLICATIONS

4DU Dice Unit Advertisement written by starpoint.uk.com, printed on Sep. 3, 2002.
Addams Family Advertisement written by IGT, published in 2000.
American Bandstand (Wheel) Advertisement written by IGT published in 2002.
American Bandstand Article, published in Slot City Times in 2001.
Bally Slot Machines Electro/Mechanicals 1964/1980, Revised 3rd Edition written by Marshall Fey.
Dice Games Article describing Poker Dice, published prior to 2001.
Double Dice Advertisement written by JHV Gaming Products, undated, and English explanation from errel.com, printed on Jan. 24, 2003.
Enchanted. Unicorn Advertisement written by IGT, published in 2001.
Field Testing New Slots Article, written by Strictly Slots, published in Jul. 2000.
Free! 7/Day Trial on Daval's Reel Dice Advertisement written by Gerber & Glass, published in 1936.
Game Devices Advertisement written by starpoint.uk.com, printed on Sep. 3, 2002.
How to Play—Roll & Win Instructions written by WMS Gaming, wmsgaming.com, printed on Aug. 29, 2001.
Jazzy Jackpot Advertisement written by Atronic Casino Technology, Ltd., published in 2001.
Levy Patent Abstract written by Derwent Publications Ltd., published in 1991.
Mikohn Solutions, World Gaming Congress 2000 Edition.
Money Grab Advertisement written by WMS Gaming, Inc., wmsgaming.com, printed on Jan. 30, 2003.
Money Grab Article written by Strictly Slots, published in Apr. 2001.
Money to Burn Advertisement written by WMS, published prior to 2004.
Monopoly Brochures and Articles, written by WMS Gaming, Inc. published 1998.
Monopoly Movers & Shakers Article written by Strictly Slots, published Jul. 2000.
Monopoly Party Train Article written by Strictly Slots, published Feb. 2002.
Monte Carlo Advertisement written by Bally Gaming, published prior to Sep. 12, 2002.
New Kids Article written by Strictly Slots, published in Dec. 2000.
One page sheet showing and describing 1977 Bally Monte Carlo game.
Pink Panther Trail Advertisement written by IGT, published in 2000.
Roll & Win Advertisement written by WMS Gaming, wmsgaming.com, printed Jun. 8, 2001.
Slot Machine Buyer's Handbook, A Consumer's Guide to Slot Machines written by David L. Saul and Daniel R. Mead, published 1998.
Slot Machines A Pictorial History of the First 100 Years, 5th edition, written by Marshall Fey, published 1983 to 1997.
Slot Machines On Parade written by Robert N. Geddes and illustrated by Daniel R. Mead, published 1980.
Slot Machines written by Marshal Fey, published 1997.
Spin-a-lot advertisement, written by Acres Gaming, published prior to 2004.
Stars, Bars and Bones Game P&M Coins, Inc. available 1997.
Take Your Pick Article, written by Strictly Slots, published in Mar. 2001.
Third Party Submission in Published Application Under 37 C.F.R. 1.99 for U.S. Appl. No. 13/106,570, filed Nov. 8, 2011.
Wheel & Deal Brochure written by Strictly Slots, published in Dec. 2001.
Wheel of Fortune Advertisement written by IGT, published in 1998.
Wheel of Fortune Advertisement written by IGT, published in 1999.
Wheel Poker Brochure written by Strictly Slots, published prior to Sep. 12, 2002.
Yahtzee Bonus Advertisement, written by Mikohn Winning Solutions Worldwide, published 1999.
Yahtzee Video Game Advertisement, written by Mikohn Winning Solutions Worldwide, published 1999.
Non-Final Office Action for U.S. Appl. No. 13/106,584 dated Apr. 4, 2013.
Office Action for U.S. Appl. No. 13/106,570 dated Jun. 20, 2013.

* cited by examiner

GAMING DEVICE HAVING MULTIPLE INTERACTING INDEPENDENTLY OPERABLE WHEELS

PRIORITY CLAIM

This application is a divisional application of, claims priority to and the benefit of U.S. patent application Ser. No. 13/115,644, filed on May 25, 2011, which is a continuation application of, claims priority to and the benefit of U.S. patent application Ser. No. 12/207,422, filed on Sep. 9, 2008, now U.S. Pat. No. 7,967,676, which is a divisional application of, claims priority to and the benefit of U.S. patent application Ser. No. 10/953,822, filed on Sep. 29, 2004, now U.S. Pat. No. 7,425,177, the entire contents of each are incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming device manufacturers strive to make gaming devices that provide as much enjoyment and excitement as possible. Providing a secondary or bonus game in which a player has an opportunity to win potentially large awards or credits in addition to the awards associated with the primary or base game of the gaming device is one way to enhance player enjoyment and excitement.

Gaming devices having bonus games generally employ a triggering event that occurs during the base game. The triggering event temporarily stalls or halts the base game play and enables a player to enter a second, different game, which is the bonus game. The player plays the bonus game, likely receives an award and returns to the base game.

One known type of bonus game employs a wheel including several awards. One such bonus game is in the "WHEEL OF FORTUNE" gaming device manufactured by the assignee of this application. A multi-colored award wheel is attached to the cabinet of the gaming device. The award wheel is divided into several sections. Each section includes an award that ranges in value, such as from twenty-five to one-thousand. A player plays a base game that includes spinning reels and one or more paylines. When a wheel symbol is positioned along a designated payline on the third reel, the player enters the bonus game.

In the bonus game, the player obtains one opportunity or spin of the award wheel. The player spins the award wheel by pressing a button on the gaming device. Once the award wheel starts spinning, the player waits until it stops. An indicator located at the top of the award wheel points to a section of the wheel. The player receives the award on the indicated section for the bonus game. After the player receives that award, the bonus game ends and the player may resume playing the base game.

In other bonus games, such as the game disclosed in U.S. Pat. No. 6,224,483, a player spins a wheel including several awards. The number of spins of the wheel provided to the player is based on the number of paylines that the player played in the primary game, the number of credits wagered on the paylines or a specific symbol or symbol combination is generated on the reels in the primary game. In this game, the player spins the wheel and obtains a single award, such as between twenty-five and one-thousand credits in each spin. The bonus game ends when the player has no spins remaining and the player receives the total accumulated award from the bonus game.

Other bonus games, such as the game disclosed in U.S. Pat. No. 6,162,121, includes a plurality of wheels which may be employed in determining a player's bonus award. In this game, a wheel which provides the potential for a jackpot prize can only be activated if the player has previously achieved a predefined result on a previous spin of another wheel. For example, a first wheel is activated to spin. After the first wheel spins, if a predetermined result is indicated on the first wheel, a second wheel is activated to spin. After the second wheel spins, if a predetermined result is indicated on the second wheel, a third wheel is activated to spin. The player can receive the top award from the spin of the third wheel.

Gaming devices that increase the opportunities to obtain awards and increase the size of the awards are desirable. Players are attracted to games that provide several larger awards and the opportunity to obtain a large award. Therefore, to increase player enjoyment and excitement, it is desirable to provide new games for gaming devices.

SUMMARY

The present invention relates in general to a gaming device, and more particularly to a gaming device having multiple interacting independently operated symbol generators. Each symbol generator, either alone or in combination with one or more other symbol generators, is adapted to generate one or more symbols. The generated symbol(s) may cause the subsequent activation of one or more of the other symbol generators or may cause a terminating condition to occur. In one embodiment, each symbol is associated with one of a plurality of values, modifiers, characteristics, game play functions or other suitable indicia. In this embodiment, upon a suitable triggering event, one or more of the symbol generators are activated either sequentially, simultaneously or in an overlapping fashion and an outcome based on the results from one or more symbol generator activations is determined and provided to the player. It should be appreciated that the present invention provides a gaming device where the outcome ultimately provided to the player is based on one or more independent activations of one or more symbol generators wherein each independent activation determines, at least in part, at least one subsequent activation.

In general, when one or more of the plurality of symbol generators are activated, each activated symbol generator generates or selects one of a plurality of symbols. The generated symbol(s) may be associated with awards, terminators, subsequent activations of one or more symbol generators and/or any other suitable function. After generating one or more symbols, the gaming device determines if, based on the generated symbol(s), the multi-symbol generator game terminates, one or more of the plurality of symbol generators should be activated or any other suitable game play function should be initiated. If the gaming device determines to activate one or more of the plurality of symbol generators, each activated symbol generator generates or selects one or more symbols. This process continues as described above until the multi-symbol generator game terminates. Upon the termination of the multi-symbol generator game, the player is provided an outcome, such as an award or a modifier, which is based on one or more of the generated symbols.

In one embodiment, the plurality of symbol generators are wheels that each include a plurality of sections. In this embodiment, the wheels are suitably arranged in a configuration of a center or inner wheel and a plurality of peripheral or outer wheels. Each of the sections of the inner wheel includes an indicator or pointer which is adapted to indicate one of the outer wheels. Each of the sections of the inner wheel displays an associated characteristic, such as a color, a month of the year or any other suitable component from a common theme. Each of the sections of the inner wheel also displays an associated modifier, such as a multiplier. For example, one of the sections of the inner wheel may be associated with the color blue and a multiplier of 2×, while another section of the inner wheel may be associated with the color red and a multiplier of 4×. In this embodiment, each of the sections of each of the outer wheels displays an associated value.

In this embodiment, the gaming device also provides a plurality of selections that are each associated with one or more characteristics. For example, each of the selections is associated with either a color symbol or a wild symbol. Each color symbol is associated with one of the different colors of the sections of the inner wheel. In one embodiment, each wild symbol is associated with a different plurality of the colors of the sections of the inner wheel. In another embodiment, each wild symbol is associated with each of the colors of the sections of the inner wheel. For example, one selection may be associated with a "blue" symbol, another selection may be associated with a "red/blue wild" symbol and another selection may be associated with an "all color wild" symbol.

In this embodiment, the gaming device also includes a plurality of different tracking sets or meters which are each associated with one of the different characteristics described above. In one embodiment, each tracking set or meter is associated with one of the colors of one of the sections of the inner wheel. For example, one meter or tracking set is associated with the red colored section of the inner wheel and another meter or tracking set is associated with the blue colored section of the inner wheel. Each tracking set or meter tracks the symbols associated with the different colors which have been selected and revealed to the player.

In operation, one of the selections is picked and the color symbol or wild symbol associated with the picked selection is revealed. If a color symbol is revealed, the tracking set or meter associated with the revealed color is incremented. If a wild symbol is revealed, then each tracking set associated with the colors associated with the revealed wild symbol is incremented. For example, if a two color wild symbol is revealed, the tracking sets associated with the two revealed colors are each incremented.

After incrementing one or more of the colored tracking sets or meters, the gaming device determines whether any of the colored tracking sets or meters are complete. A complete tracking set or meter is one that has been incremented a predetermined number of times. If none of the colored tracking sets or meters are complete, the gaming device enables the player to pick another selection and the game proceeds as described above until one of the colored tracking sets or meters is complete.

If at least one of the colored tracking sets or meters is complete, the gaming device activates each of the plurality of wheels to spin. After the wheels have stopped, the section of the inner wheel that corresponds in color with the complete tracking set or meter indicates a value on one of the outer wheels. For example, if the complete tracking set is associated with the color red, then the indicator of the red section of the inner wheel will point to or indicate one of the displayed values of one of the sections of one of the outer wheels. The indicated value is then modified by the modifier associated with the section of the inner wheel that corresponds in color with the color of the complete tracking set or meter to form an award. For example, the modifier of 4× which is associated with the red section of the inner wheel is applied to an indicated value of ten to form an award of forty. The formed award is provided to the player and the multi-wheel game ends.

In another embodiment, each of the sections of each of the wheels is associated with an award, such as a value. In this embodiment, one or more of the wheels are activated and an initial offer is formed based on the values of the indicated sections of each of the activated wheels. The gaming device enables the player to accept this offer or reject this offer. If the player accepts the initial offer, the offer is provided to the player and this embodiment of the multi-wheel game ends. If the player rejects the initial offer (and the offer is not a last or final offer), one or more the wheels are activated and another offer is formed based on the indicated sections of each of these activated wheels. Again, the gaming device enables the player to accept this offer or reject this offer. This process continues until either the player accepts one of the offers or the offer is a final offer which is automatically provided to the player. In one embodiment, the same wheels which were previously activated to form the initial offer are activated again to form one or more of the subsequent offers. In another embodiment, each offer is formed based on the indicated sections from a different wheel or combination of wheels.

In another embodiment, each of the sections of each of the wheels is associated with a color. In this embodiment, an initial wheel is activated and a color is selected, either by the player or by the gaming device. If the section indicated on the spun wheel does not match the selected color, the player is provided any outcome or value of the indicated section and the multi-wheel game ends. If the section indicated on the spun wheel matches the selected color, the multi-wheel game continues with another wheel activated and another color selected. This process continues until the color of an indicated section does not match the selected color or until a predetermined number of activations have occurred.

It should be appreciated that the present invention provides a multiple symbol generator game wherein the outcome obtained or indicated on one symbol generator interacts or causes an outcome to be obtained or indicated on another symbol generator. Providing a plurality of independently interacting symbol generators provides increased excitement and enjoyment for the player.

Additional features and advantages of the present invention are described in, and will be apparent from, the following Detailed Description of the Invention and the figures.

DETAILED DESCRIPTION

Figure 1A:
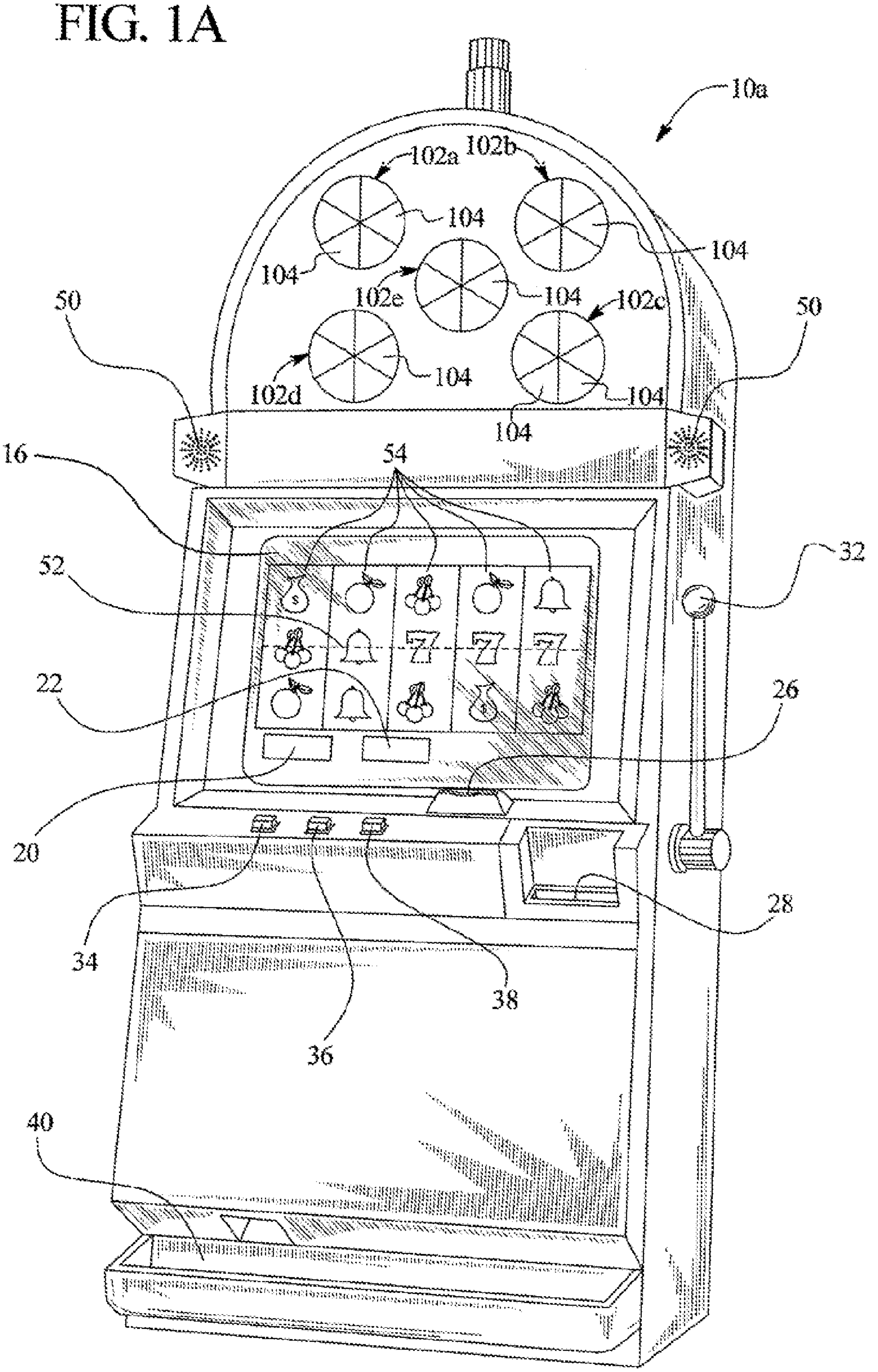
FIG. 1A is a front-side perspective view of one embodiment of the gaming device of the present invention.
Figure 1B:
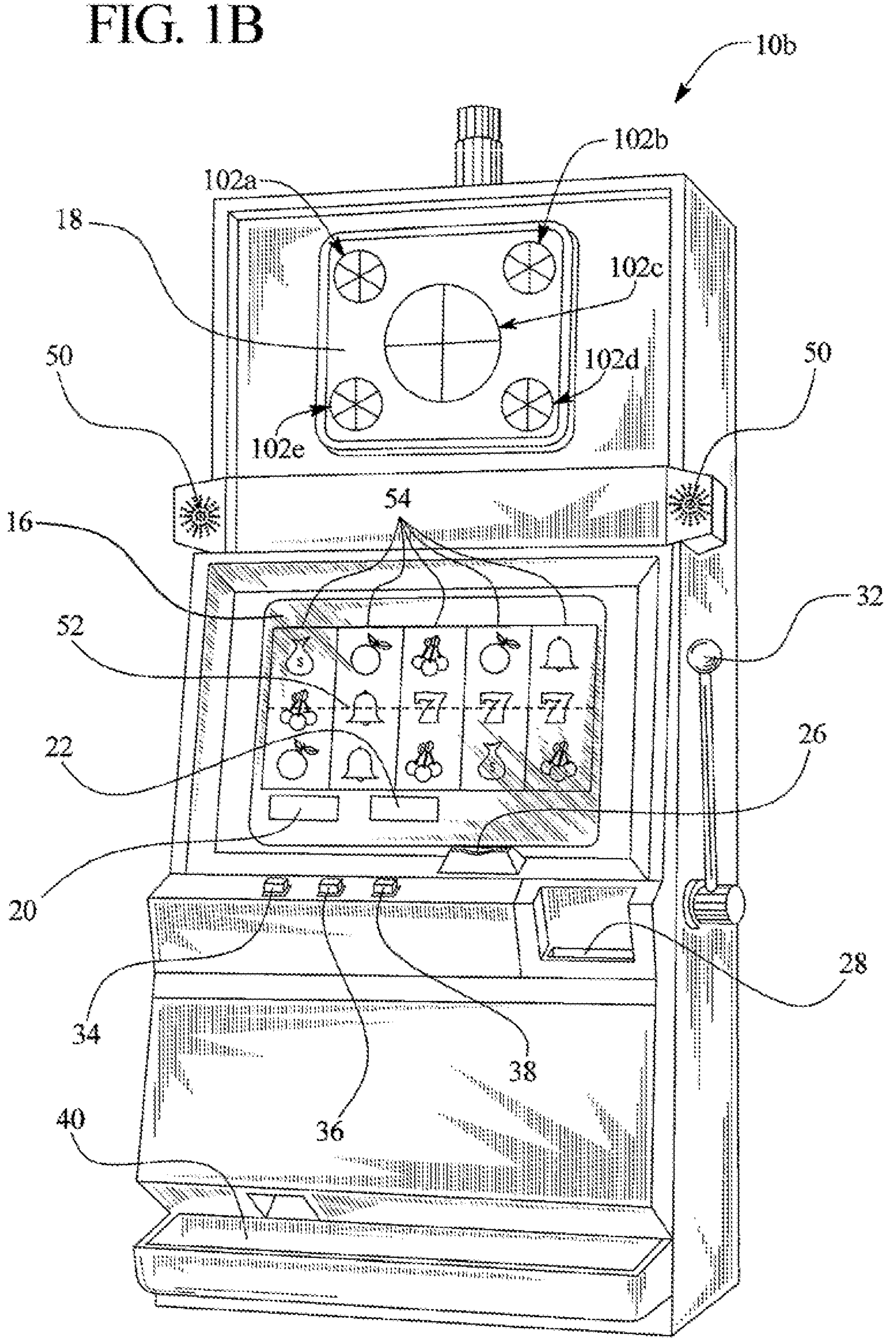
FIG. 1B is a front-side perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
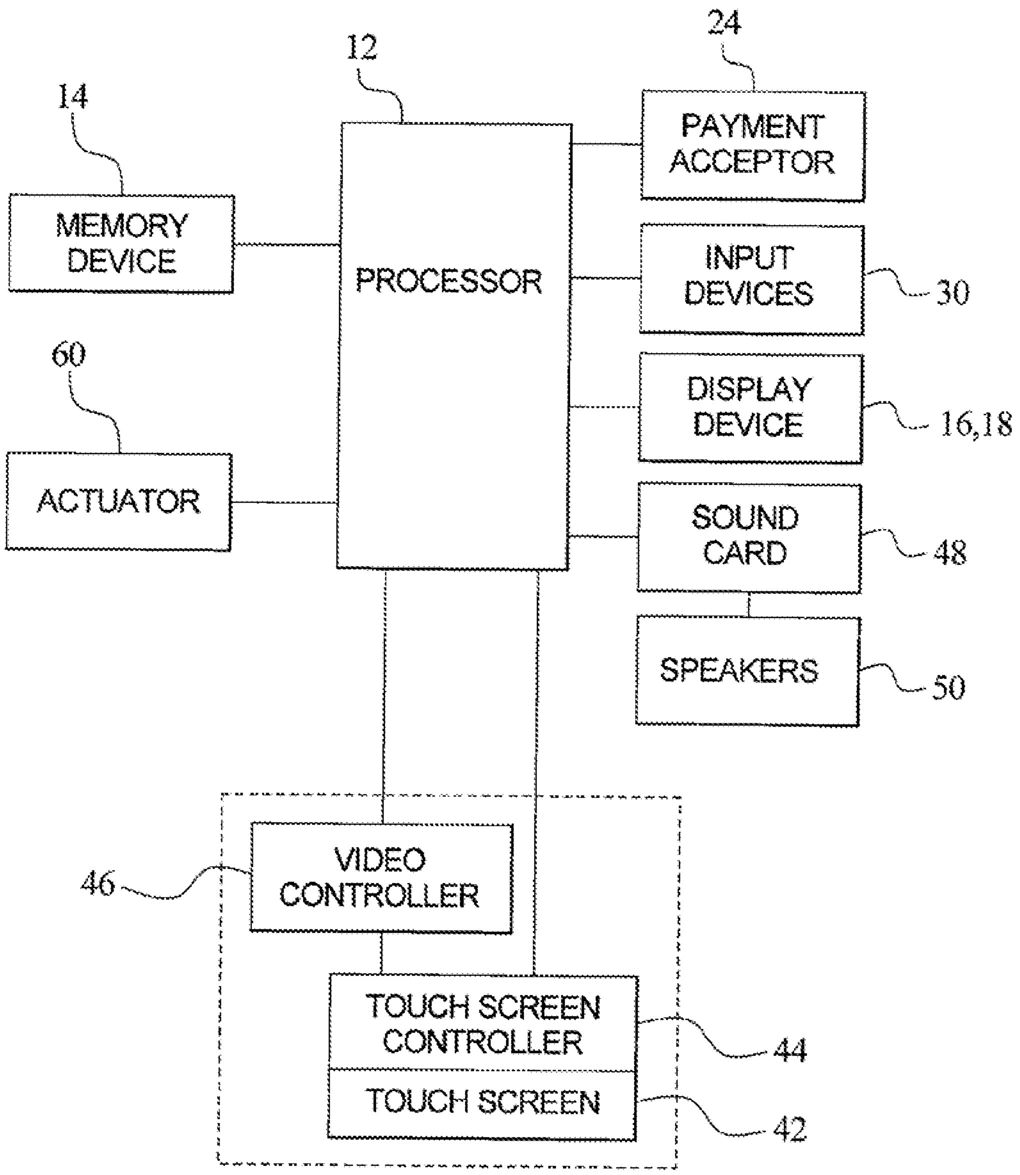
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or other operating data, information and applicable game rules that relate to the play of the gaming device. In another embodiment, the memory device includes random access memory (RAM). In one embodiment, the memory device includes read only memory (ROM). In a further embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (FDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. In this type of embodiment, the gaming device provides players with all of the available awards or other game outcomes over the course of the play cycle and guarantees a designated amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered.

The display devices may include, without limitation, a monitor, a television display, a plasma display, a liquid crystal display (LCD), a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of games or other suitable images, symbols and indicia such as any visual representation or exhibition of the movement of objects such as mechanical, virtual or video reels or symbol generators, such as wheels, dynamic lighting, video images and images of people, characters, places, things and faces of cards, tournament advertisements, promotions and the like.

In one embodiment, as illustrated in FIG. 1A, the gaming device includes a plurality of electromechanical symbol generators 102*a*, 102*b*, 102*c*, 102*d* and 102*e*, such as rotatable wheels, reels, dice which are each attached to the housing of the gaming device. In one embodiment, the symbol generators are arranged in the pattern as illustrated in FIG. 1A. In another embodiment, the symbol generators are arranged in any suitable configuration. In one embodiment wherein the symbol generators are each a rotatable wheel, each wheel includes a plurality of sections 104 wherein each section displays a symbol, award, outcome, image or other suitable indicia. As illustrated in FIG. 2A, each mechanical rotatable wheel is associated with and connected to a suitable actuator or motor 60 which is controlled by the processor. The associated actuator or motor is adapted to drive or rotate the rotatable wheel in a clockwise or counterclockwise direction. In an alternative embodiment, any suitable electromechanical device which preferable moves one or more interacting objects, such as one or more reels or dice, which are configured to display at least one and preferably a plurality of games or other suitable images, symbols or indicia may be employed with the present invention.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards, data cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game associated with the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips which are redeemable by a cashier or funded to the players electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display device may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

The gaming device can incorporate any suitable wagering primary or base game. The gaming machine or device of the present invention may include some or all of the features of conventional gaming machines or devices. The primary or base game may comprise any suitable reel-type game, card game, number game or other game of chance susceptible to representation in an electronic or electromechanical form which produces a random outcome based on probability data upon activation of the game from a wager made by the player. That is, different primary wagering games, such as video poker games, video blackjack games, video keno, video bingo or any other suitable primary or base game may be implemented into the present invention.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one reel and preferably a plurality of reels 54, such as three to five reels, in either electromechanical form with mechanical rotating reels or in video form with simulated reels and movement thereof. In one embodiment, an electromechanical slot machine includes a plurality of adjacent, rotatable wheels which may be combined and operably coupled with an electronic display of any suitable type. In another embodiment, if the reels are in video form, the plurality of simulated video reels are displayed on one or more of the display devices as described above. Each reel displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning combination or pattern.

In one embodiment, a base or primary game may be a poker game wherein the gaming device enables the player to play a conventional game of video poker and initially deals five cards, all face up, from a virtual deck of fifty-two cards. Cards may be dealt as in a traditional game of cards or in the case of the gaming device, the cards may be randomly selected from a predetermined number of cards. If the player wishes to draw, the player selects the cards to hold by using one or more input devices, such as pressing related hold buttons or touching a corresponding area on a touch-screen. After the player presses the deal button, the processor of the gaming device removes the unwanted or discarded cards from the display and deals replacement cards from the remaining cards in the deck. This results in a final five-card hand. The processor of the gaming device compares the final five-card hand to a payout table which utilizes conventional poker hand rankings to determine the winning hands. Award based on a winning hand and the credits wagered is provided to the player.

In another embodiment, the base or primary game may be a multi-hand version of video poker. In this embodiment, the player is dealt at least two hands of cards. In one such embodiment, the cards in all of the dealt hands are the same cards. In one embodiment each hand of cards is associated with its own deck of cards. The player chooses the cards to hold in a primary hand. The held cards in the primary hand are also held in the other hands of cards. The remaining non-held cards are removed from each displayed hand and replaced with randomly dealt cards. Since the replacement cards are randomly dealt independently for each hand, the replacement cards will usually be different for each hand. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferably a plurality of the selectable indicia or numbers by using an input device or by using the touch-screen. The gaming device then displays a series of drawn numbers to determine an amount of matches, if any, between the player's selected numbers and the gaming device's drawn numbers. The player is provided an award, if any, based on the amount of determined matches.

In one embodiment; in addition to winning credits in a base or primary game, the gaming device may also give players the opportunity to win credits in a bonus or secondary game or bonus or secondary round. The bonus or secondary game enables the player to obtain a bonus prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game; either similar to or completely different from the base or primary game. In one embodiment, the gaming device includes a program code which causes the processor to automatically begin a bonus round when the player has achieved a triggering event, a qualifying condition or other designated game event in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be triggered by exceeding a certain amount of game play (number of games, number of credits, amount of time), earning a specified number of points during game play or as a random award.

In one embodiment, once a player has qualified for a bonus game, the player may subsequently enhance their bonus game participation by returning to the base or primary game for continued play. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game. The player must win or earn entry through play of the primary game, thereby encouraging play of the primary game. In another embodiment, qualification of the bonus or secondary game could be accomplished through a simple "buy in" by the player if, for example, the player has been unsuccessful at qualifying for the bonus game through other specified activities.

Figure 2B:
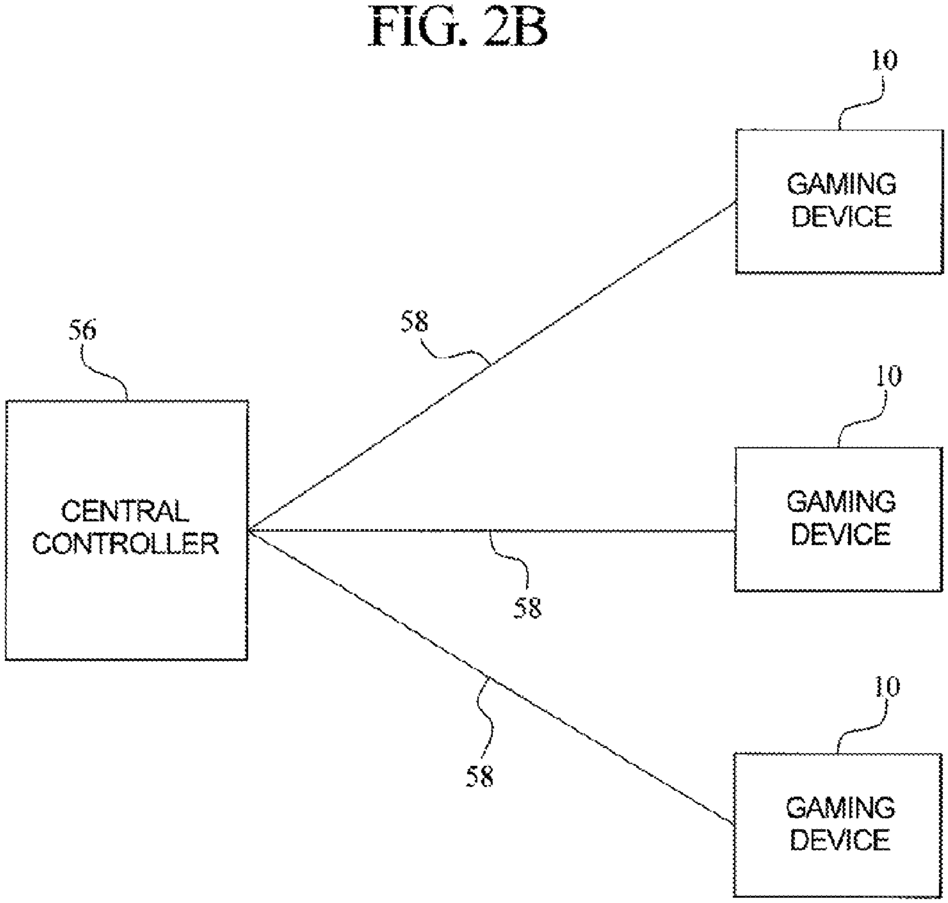
FIG. 2B is a schematic block diagram illustrating a plurality of gaming terminals in communication with a central controller.

In one embodiment, as illustrated in FIG. 2B, one or more of the gaming devices 10 of the present invention may be connected to a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and/or preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or an on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected to a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server or webserver) through a conventional phone or other data transmission line, digital signal line (DSL), T-1 line, coaxial cable, fiber optic cable, wireless gateway or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Independently Operated Interacting Symbol Generators

Referring now generally to FIGS. 3A to 3G, in one embodiment of the present invention, the plurality of symbol generators are represented as rotatable wheels which are suitably arranged in a configuration of a center or inner wheel 102 and a plurality of peripheral or outer wheels 112*a*, 112*b*, 112*c* and 112*d*.

Each of the sections of the inner wheel 104*a*, 104*b*, 104*c* and 104*d* includes or is associated with an indicator or pointer 106 which is adapted to indicate the outer wheels. Each of the sections of the inner wheel is associated with a different characteristic, such as a color 108 and a modifier 110 (such as a multiplier). For example, section 104*a* is associated with a color of red and a modifier of 4×, section 104*b* is associated with a color of blue and a modifier of 1×, section 104*c* is associated with a color of green and a modifier of 3×, and section 104*d* is associated with a color of yellow and a modifier of 2×.

In one embodiment, each of the modifiers are different. In another embodiment, a plurality of the modifiers are different. In another embodiment, each of the modifiers are the same. In one embodiment, the modifiers are selected from a pool of modifiers or a range of modifiers. In other embodiments, the modifiers are predetermined, randomly determined, determined based on the player's wager in the primary game, determined from the occurrence of one or more symbols or symbol combinations in the primary game, or determined based on any other suitable method.

Figure 3A:
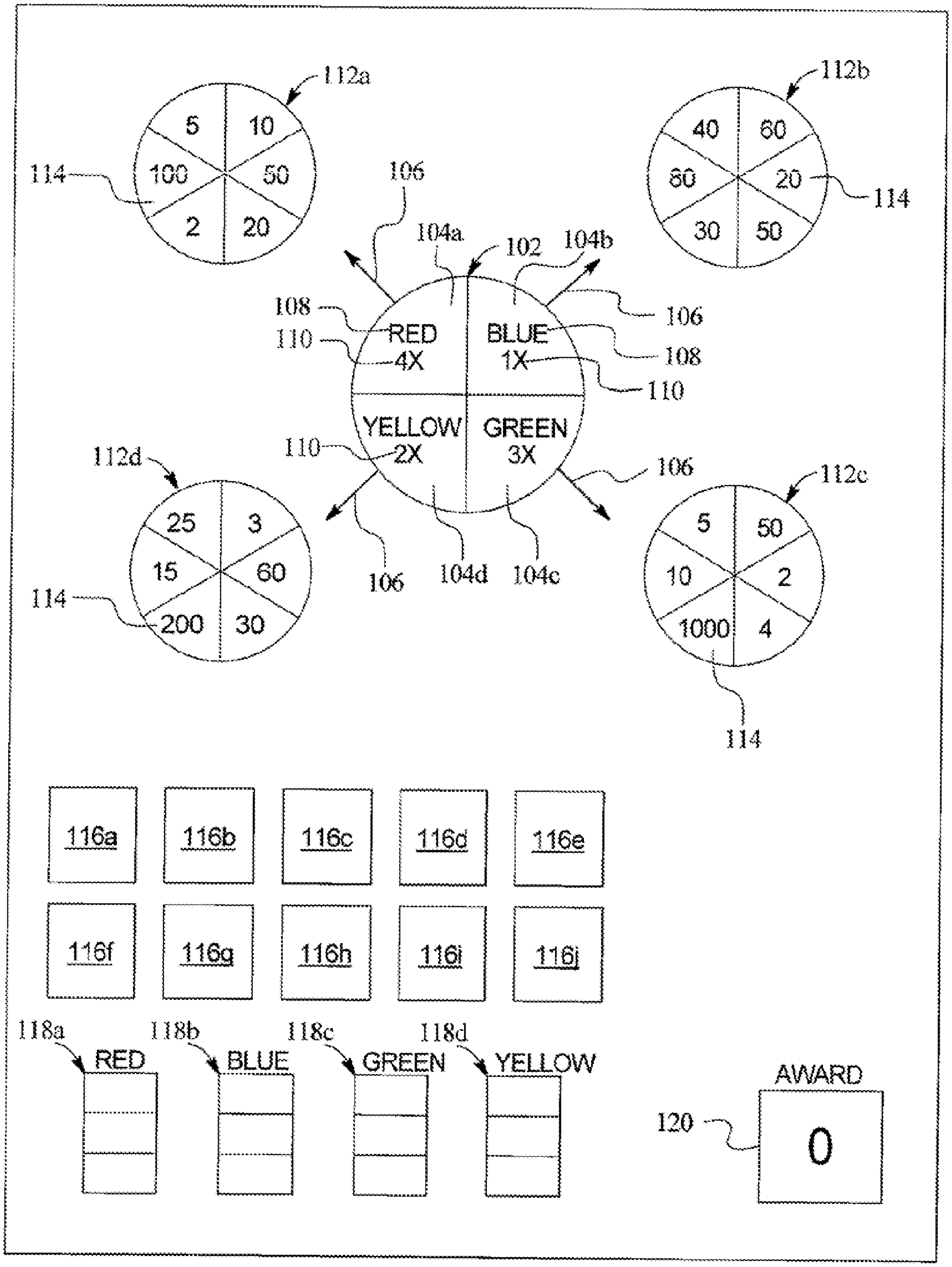
FIGS. 3A, 3B, 3C, 3D, 3E, 3F and 3G are front elevational views of one embodiment of the present invention illustrating a plurality of selections picked to determine a modifier which modifies a value indicated on one of a plurality of activated wheels.

As seen in FIG. 3A, in this embodiment, each of the sections of each of the outer wheels is associated with an award, such as a value 114. In one embodiment, each of the values associated with each of the sections of each of the outer wheels are different. In another embodiment, a plurality of the values are different. In another embodiment, at least one value is associated with two different sections from two different outer wheels. In another embodiment, the plurality of values associated with each of the wheels are the same. In another embodiment, an average of the plurality of values associated with each wheel is the same. In another embodiment, an average of the plurality of the values associated with each wheel is different.

In one embodiment, the values are selected from a pool of values or a range of values. In other embodiments, the values are predetermined, randomly determined, determined based on the player's wager in the primary game, determined from the occurrence of one or more symbols or symbol combinations in the primary game or determined based on any other suitable method.

As seen in FIG. 3A, in this embodiment, the gaming device also provides a plurality of selections 116*a* to 116*j*. Each of the selections is associated with one or more of the characteristics associated with the inner wheel. In this example, each of the selections is associated with either a color symbol or a wild symbol. A color symbol is associated with a color that corresponds with one of the colors associated with one of the sections of the inner wheel. In one embodiment, the wild symbol is associated with a plurality of the colors of the sections of the inner wheel. In another embodiment, the wild symbols is associated with each of the colors of the sections of the inner wheel.

The gaming device also includes a plurality of different tracking sets or tracking meters 118*a*, 118*b*, 118*c* and 118*d*. Each tracking set or tracking meter is associated with one of the characteristics of one of the sections of the inner wheel. For example, tracking set 118*a* is associated with the red colored section 104*a* of the inner wheel, tracking set 118*b* is associated with the blue colored section 104*b* of the inner wheel, tracking set 118*c* is associated with the green colored section 104*c* of the inner wheel and tracking set 118*d* is associated with the yellow colored section 104*d* of the inner wheel. Each tracking set or meter tracks the amount of symbols associated with the different selections which have been selected and revealed to the player.

Figure 3B:
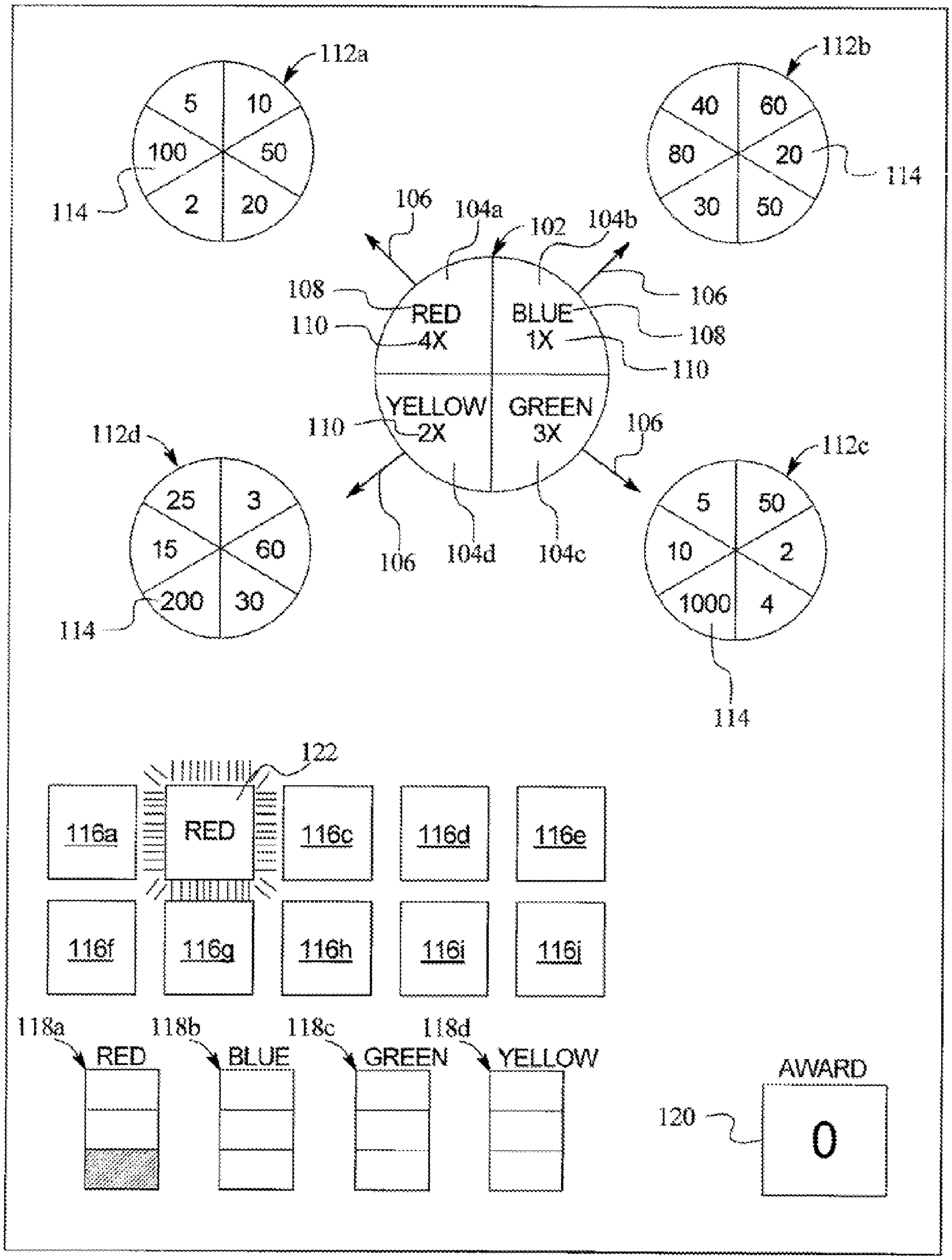

As seen in FIG. 3B, upon or after a suitable triggering event, one of the selections is picked. The picked selection is revealed to be associated with either a color symbol or a wild symbol. In this case, the player picked selection 116*b* is revealed to be associated with a red colored symbol 122. Accordingly, the tracking set or tracking meter associated with the same color as the revealed symbol tracks the revealed symbol. In this case, the red tracking set or tracking meter 118*a* tracks the revealed red colored symbol and increments the red meter by one unit.

In one embodiment, different symbols associated with the same color increment the appropriate tracking set or meter by different numbers of incremental units or in any other suitable different way. For example, one red colored symbol may increment the red meter by one unit and another red colored symbol may increment the red meter by more than one units.

After the appropriate meter or tracking set has tracked or incremented to account for the revealed symbol, the gaming device determines if any of the tracking sets are complete. A meter or tracking set is complete when it has been incremented a predetermined number of times or to a predetermined level of increments. In this case, the number of increments is three and the gaming device determines that none of the meters or tracking sets are complete (i.e., have been incremented the predetermined number of three times). Accordingly, the player is enabled to pick another one of the plurality of selections.

Figure 3C:
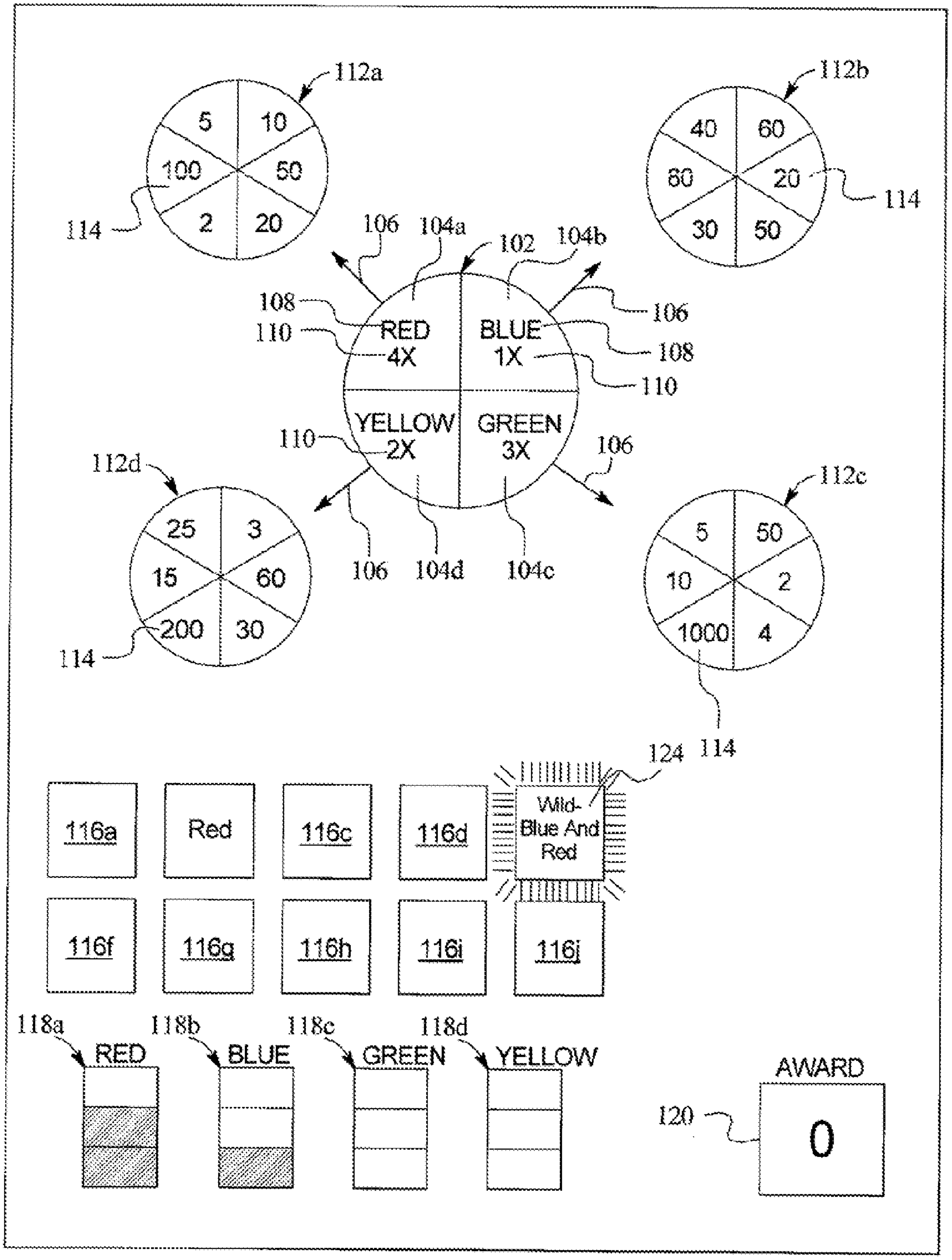

As seen in FIG. 3C, the player picked selection 116*e* which is revealed to be associated with a wild symbol 124, in this case, a blue/red wild symbol. A wild symbol is associated with more than one different color of the sections of the inner wheel. The revealed blue/red wild symbol causes both the red meter 118*a* and the blue meter 118*b* to increment one unit.

In one embodiment, a wild symbol is associated with a plurality of different colors of the sections of the inner wheel. In another embodiment, a wild symbol is associated with each of the colors of the sections of the inner wheel. In one embodiment, the different colors associated with one or more wild symbols may increment the appropriate tracking sets or meters by different numbers of incremental units or in other suitable different way. For example, a blue/green wild symbol may increment the blue meter by one unit and the green meter by two units.

Figure 3D:
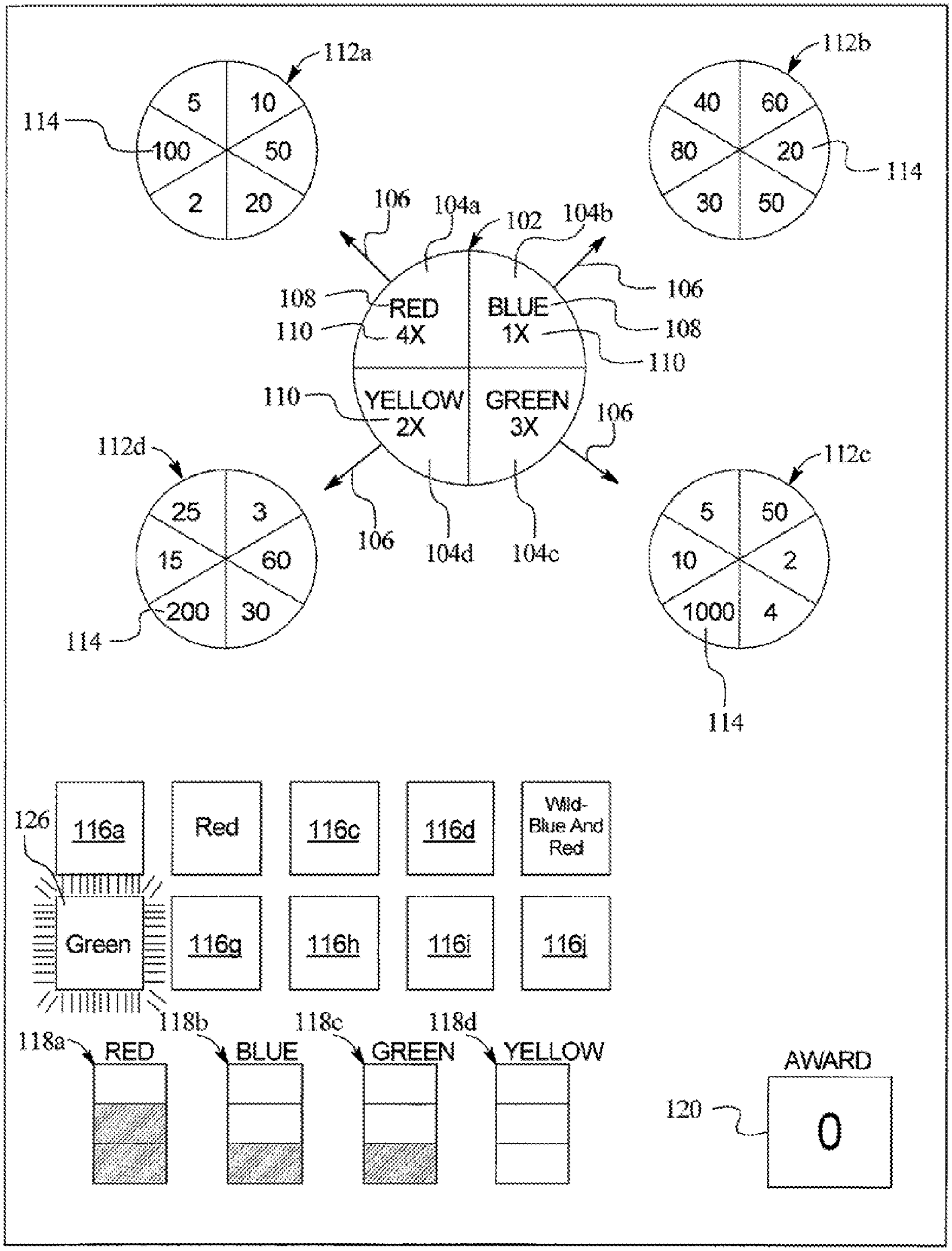

As seen in FIG. 3D, after determining that none of the meters or tracking sets are complete (i.e., have been incremented the predetermined number of three times), the gaming device enables the player to pick another one of the plurality of selections. In this case, the player picked selection 116*f* which is revealed to be associated with a green symbol 126. Accordingly, the tracking set or meter 118*c* associated with the green colored symbol tracks the revealed green symbol and increments the green meter by one unit.

Figure 3E:
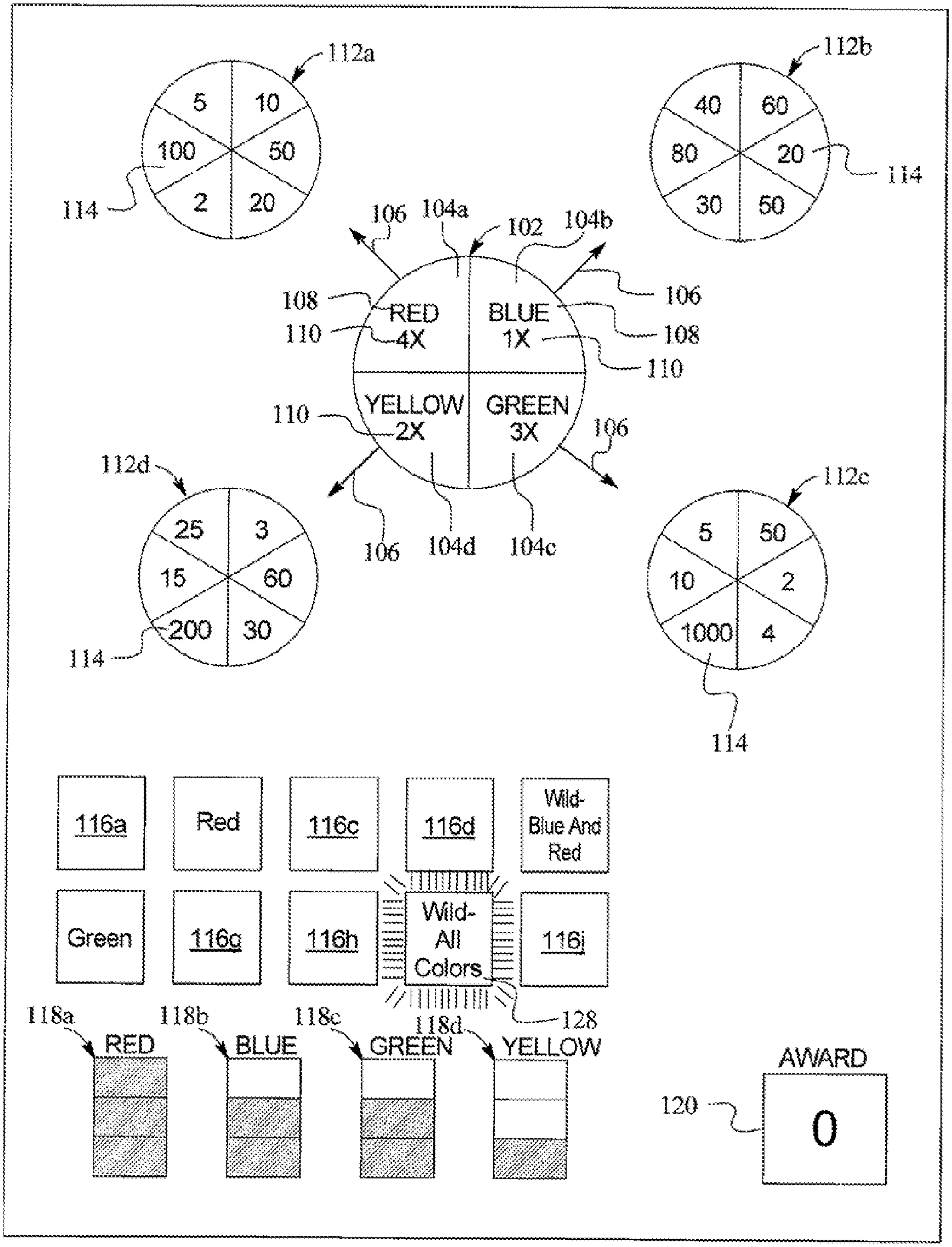

As seen in FIG. 3E, after determining that none of the meters or tracking sets are complete (i.e., have been incremented the predetermined number of three times in this illustration), the gaming device enables the player to pick another one of the plurality of selections. In this case, the player picked selection 116*i* which is revealed to be associated with an all color wild symbol 128. Accordingly, the tracking sets or meters 118*a* to 118*d* associated with all of the colors of the sections of the inner wheel track each of the colors associated with the all color wild symbol and increment each of the colors by one unit. Since at least one of the tracking sets or meters is complete, which in this example is the red tracking set or meter 118*a* (i.e., has been incremented the predetermined number of three times), the gaming device proceeds to the next phase of the game.

Figure 3F:
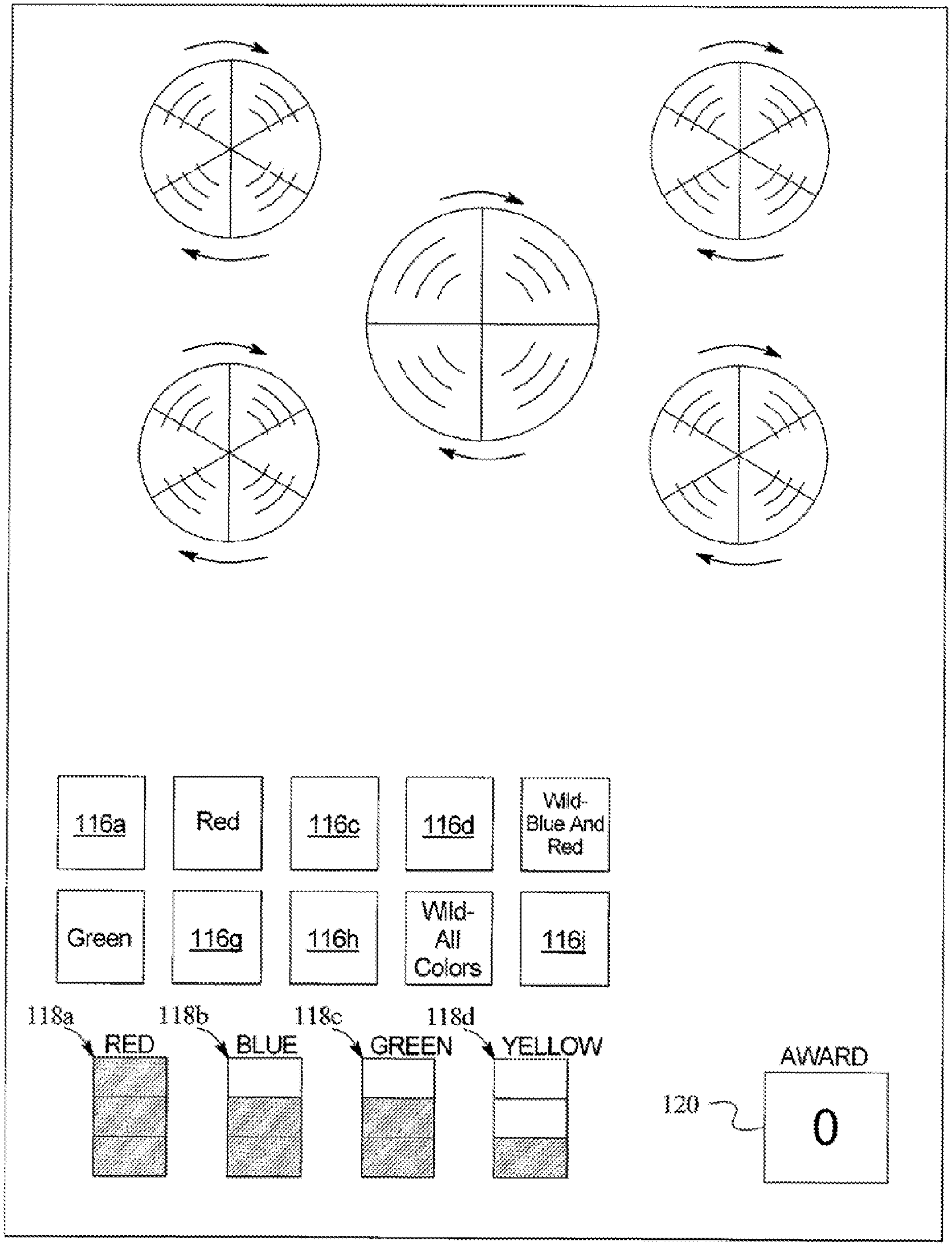
Figure 3G:
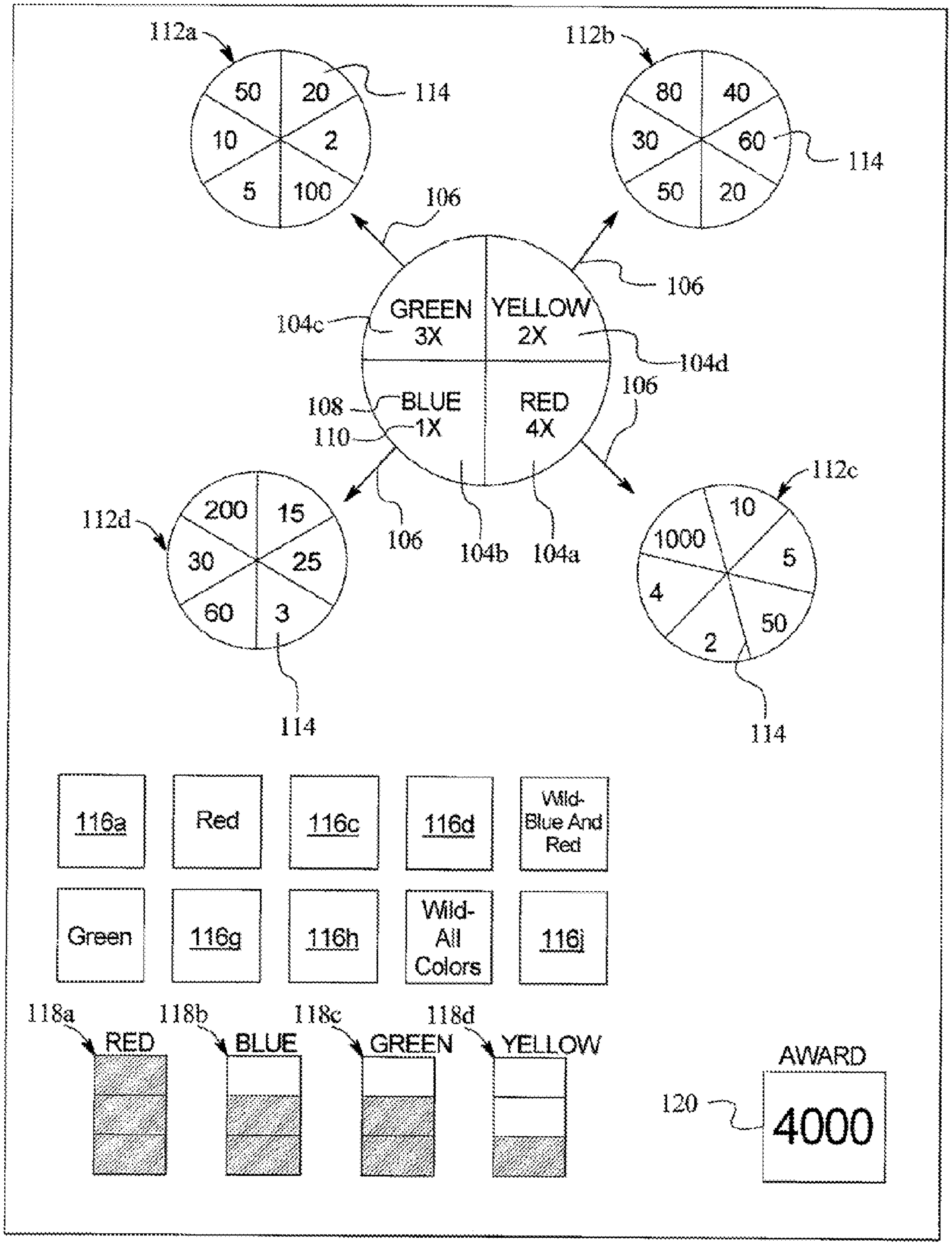

As illustrated in FIG. 3F, the next phase of the game includes activating each of the plurality of wheels to spin. As seen in FIGS. 3G, after the wheels have stopped spinning, the section of the inner wheel that corresponds in color with the complete tracking set or meter indicates a value associated with one of the sections of the outer wheels. The indicated value is modified by the modifier associated with that section of the inner wheel which corresponds in color with the color of the complete tracking set or meter to form an award. In this case, as the red tracking set 118*a* was completed, the section of the inner wheel associated with the color red 104*a* is activated and the indicator 106 of section 104*a* is pointing to or indicating a value of one-thousand. Accordingly, the indicated value of one-thousand is modified by the modifier of 4× associated with the activated red section 104*a* to result in or form an award of four-thousand. This award of four-thousand is provided to the player as indicated in the award display 120 and this embodiment of the game ends.

In another embodiment (not shown), if a plurality of tracking sets or meters are simultaneously completed or a plurality of tracking sets or meters are completed during the first phase of the game (i.e., before the wheels are activated), an award if formed and provided to the player for each completed tracking set. In this embodiment, the indicator of each of the sections of the inner wheel that corresponds in color with each of the completed colored tracking sets indicates a value which is modified by any modifier associated with the colors of the completed tracking sets. For example, if the yellow tracking set or meter would have been completed simultaneously with the red tracking set or meter, then the gaming device would have formed an award based on the value of one of the sections of one of the outer wheels which is indicated or pointed to by the yellow section of the inner wheel. In this case, the indicated value of fifty pointed to by the indicator of the yellow section would be modified by the modifier of 2× (associated with the yellow section) to form an award of one-hundred. In this embodiment, the award of one-hundred is provided to the player in addition to the award of four-thousand which is determined as described above.

In another embodiment, one or more of the wheels are adapted to designate one or more of the other wheels. In this embodiment, at least one section of one or more of the wheels is associated with a designator of another wheel and the remaining sections are associated with outcomes. In one embodiment, an initial or first wheel spins. If the initial wheel indicates an outcome, the outcome is provided to the player and the multi-wheel game ends. If the initial or first wheel indicates a designator of one of the other wheels, the designated other or second wheel spins. The second wheel spins and if the second wheel indicates an outcome, the outcome is provided to the player and the multi-wheel game ends. If the second wheel indicates a designator of another one of the plurality of wheels, the other designated wheel spins. This process continues until an outcome is indicated on one of the wheels, the outcome is provided to the player and the multi-wheel game ends.

In another embodiment, the plurality of wheels are arranged as a central or inner wheel and one or more peripheral or outer wheels as described above. In this embodiment, at least one section of one of the outer wheels designates the inner wheel and each section of the inner wheel is associated with an award. In this embodiment, one or more of the outer wheels are activated to spin and if any of the outer wheels indicates a section associated with a designator of the inner wheel, the inner wheel is activated to spin. The inner wheel spins and any award indicated by the inner wheel is provided to the player.

In another embodiment, each of the sections of each of the wheels is associated with a characteristic, such as color and an outcome, such as a value. In this embodiment, each of the wheels spins and the award provided to the player is based on the colors and outcomes indicated on one or more of the wheels. In one embodiment, the award is based on the outcomes associated with one or more indicated sections with a matching color. For example, if five wheels spin and each section of each wheel is associated with one of four different colors, then at least two of the indicated sections will have the same color. In this example, if the first wheel indicates a red-ten section, the second wheel indicates a green-thirty section, the third wheel indicates a blue-twenty section, the fourth wheel indicates a red-five section and the fifth wheel indicates a yellow-five section, then the player is provided an award of fifteen which is the sum of the two matching red colored sections.

In another embodiment, each of the sections of each of the wheels is associated with a color. In this embodiment, an initial wheel is activated and a color is selected, either by the player or by the gaming device. If the section indicated on the spun wheel does not match the selected color, the player is provided any value or outcome of the indicated section and the multi-wheel game ends. If the section indicated on the spun wheel matches the selected color, the multi-wheel game continues with another wheel activated and another color selected. This process continues until the color of an indicated section does not match the selected color or until a predetermined number of activations have occurred.

In another embodiment utilizing colors, each of the sections of the wheels is associated with a value and a color. In this embodiment, each wheel is activated and a value is indicated on each wheel. Additionally, each matching indicated colors function as a modifier or multiplier of the indicated values. For example, if one section with an associated color of red and an associated value of five is indicated on one wheel and another section with an associated color of red and an associated value of ten is indicated on another wheel, then an outcome of thirty is provided to the player based on these two indicated sections. That is, since two red colored sections are indicated, a multiplier of two is applied to the values of five and ten associated on the two red colored sections to result in an outcome of thirty.

In another embodiment, each of the wheels is associated with a color. In this embodiment, the player picks one of a plurality of selections to reveal a color. The wheel which is associated with the revealed color is activated to spin and any outcome or award indicated on the spun wheel is provided to the player. After the outcome or award is provided to the player, the gaming device determines whether any of the wheels have been activated a predetermined number of times. If at least one of the wheels has been activated the predetermined number of times, this embodiment of the multi-wheel game ends. If none of the wheels have been activated the predetermined number of times, the gaming device enables the player to select another selection to reveal a color. The wheel which is associated with the revealed color is activated to spin and this embodiment proceeds as described above until the gaming device determines that at least one of the wheels has been activated the predetermined number of times.

In another embodiment of the present invention, the gaming device provides a plurality of selections. One or more of the selections are associated with one or more of the wheels and one or more of the selections are associated with terminators. The gaming device does not initially reveal which selections are associated with wheels and which selections are associated with terminators. In operation, the gaming device enables a player to pick one of the selections. The wheel or terminator associated with the player picked selection is revealed. If the picked selection is revealed to be associated with a terminator, this embodiment of the multi-wheel game ends. If the picked selection is revealed to be associated with one of the plurality of wheels, the revealed wheel is activated to spin. Any outcome or award indicated on the spun wheel is provided to the player and the gaming device enables the player to pick another one of the selections. This embodiment proceeds as described above until one of the picked selections is revealed to be associated with a terminator thus ending the multi-wheel game or no selections remain unpicked.

In another embodiment, each of the sections of each of the wheels is associated with a value. In this embodiment, one or more of the wheels are activated and an initial offer is formed based on the indicated sections of each of the activated wheels. The gaming device enables the player to accept this offer or reject this offer. If the player accepts the initial offer, the offer is provided to the player and this embodiment of the multi-wheel game ends. If the player rejects the initial offer (and the offer is not a last or final offer), one or more the wheels are activated and another offer is formed based on the indicated sections of each of these activated wheels. Again, the gaming device enables the player to accept this offer or reject this offer. This process continues until either the player accepts one of the offers or the offer is a final offer which is automatically provided to the player. In one embodiment, the same wheels which were previously activated to form the initial offer are activated again to form one or more of the subsequent offers. In another embodiment, each offer is formed based on the indicated sections from a different wheel or a different combination of wheels.

In another embodiment, each of the sections of a plurality of the wheels are associated with single-digit numbers. In this embodiment, one or more of the wheels spin and the single-digit number indicated on each wheel represents a digit of a multi-digit number which will be provided to the player. In these embodiments, the number of wheels which are activated (and thus the number of digits of the multi-digit number) is predetermined, randomly determined, determined based on the player's wager, determined based on an event in a primary game, determined based on the play of one or more supplemental games or determined in any other suitable manner. In this embodiment, the single-digit number from which wheel will represent which digit of the multi-digit number provided to the player is randomly determined, predetermined, determined based on the player's wager, determined based on the play of one or more supplemental games, determined based on an event in a primary game or determined in any other suitable manner. For example, if three of the wheels are activated and the three spun reels indicate the single-digit numbers four, seven and two, then the players multi-digit number award may be either four hundred-seventy two, four hundred-twenty seven, seven hundred-forty two, seven hundred-twenty four, two hundred-forty seven or two hundred-seventy four.

In an alternative embodiment, each of the sections of each wheel is associated with an award, such as a value amount. In this embodiment, the amount wagered in a primary game determines the number of wheels activated, wherein the greater the amount wagered results in a greater number of wheels activated. For example, the first coin activates the first wheel and the second coin activates the first wheel and the second wheel. In this embodiment, each activated wheel spins and any award indicated on any of the spun wheels is provided to the player. In one embodiment, the average value of the sections of each wheel increases from the first activated wheel to the last activated wheel such that the more the player wagers, the greater award the player may possibly obtain from the wheels.

In another embodiment, the number of wheels activated is based on a triggering event that initiates the multi-wheel game. For example, one symbol or symbol combination obtained in a primary reel game will activate two wheels to spin, while another symbol or symbol combination will activate three wheels to spin. In this embodiment, the number of activated wheels spin and any award indicated on each of the activated wheels is provided to the player.

In another embodiment, an initial wheel spins and the initial wheel indicates a number of other wheels to subsequently activate. The indicated number of other wheels are activated and the player is provided an award based on the activation of one or more of the subsequently activated wheels. For example, an initial wheel spins and the initial wheel indicates that two other wheels should be activated. Accordingly, the two other wheels spin and an award is provided to the player based on the sections indicated on the two other wheels.

In another embodiment, each section of each wheel is associated with a value amount. In this embodiment, each wheel is associated with a different range of values. In operation, a first wheel spins and the value indicated on the first wheel is provided to the player. If the value indicated on the first wheel is not within the range of values associated with the first wheel, this embodiment of the multi-wheel game ends. If the value indicated on the first wheel is within the range of values associated with the first wheel, a second wheel is activated. The second wheel spins and the value indicated on the second wheel is provided to the player. If the value indicated on the second wheel is not within the range of values associated with the second wheel, this embodiment of the multi-wheel game ends. If the value indicated on the second wheel is within the range of values associated with the second wheel, a third wheel is activated. This process continues until the value indicated on one of the wheels is not within the range of values associated with that wheel, at which time the multi-wheel game ends.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) display a plurality of award generators, each award generator including a plurality of sections, each of the plurality of sections of each award generator being associated with one of a plurality of different displayed awards;

(b) display a play of a wagering game upon a placement of one of a plurality of different wager amounts; and (c) upon an occurrence of a triggering event associated with the play of the wagering game:

(i) prior to activating any of the plurality of award generators, determine a quantity of at least one of the plurality of the award generators to activate, said determination being based on the wager amount placed in association with the displayed play of the wagering game, wherein different wager amounts placed in association with the displayed play of the wagering game are associated with different quantities of award generators to activate, (ii) activate the determined quantity of at least one of the plurality of the award generators, and (iii) for each activated award generator:

(A) indicate a section of the activated award generator, (B) determine the displayed award associated with the indicated section, (C) determine an award based on a sum of the determined displayed awards associated with the indicated sections of the activated award generators, and (D) provide the determined award to a player.

2. The gaming system of claim 1, wherein the plurality of award generators include a plurality of wheels.

3. A method of providing a wagering game, said method comprising:

(a) displaying a plurality of award generators, each award generator including a plurality of sections, each of the plurality of sections of each award generator being associated with one of a plurality of different displayed awards;

(b) causing at least one display device to display a play of a wagering game upon a placement of one of a plurality of different wager amounts; and (c) upon an occurrence of a triggering event associated with the play of the wagering game:

(i) prior to activating any of the plurality of award generators, causing at least one processor to execute a plurality of instructions to determine a quantity of at least one of the plurality of the award generators to activate, said determination being based on the wager amount placed in association with the displayed play of the wagering game, wherein different wager amounts placed in association with the displayed play of the wagering game are associated with different quantities of award generators to activate, (ii) causing the at least one processor to execute the plurality of instructions to activate the determined quantity of at least one of the plurality of the award generators, and (iii) for each activated award generator:

(A) indicating a section of the activated award generator, (B) causing the at least one processor to execute the plurality of instructions to determine the displayed award associated with the indicated section, (C) causing the at least one processor to execute the plurality of instructions to determine an award based on a sum of the determined displayed awards associated with the indicated sections of the activated award generators, and (D) providing the determined award to a player.

4. The method of claim 3, wherein the plurality of award generators include a plurality of wheels.

5. The method of claim 3, which is provided through a data network.

6. The method of claim 5, wherein the data network is an internet.

* * * * *